UNITED STATES PATENT OFFICE.

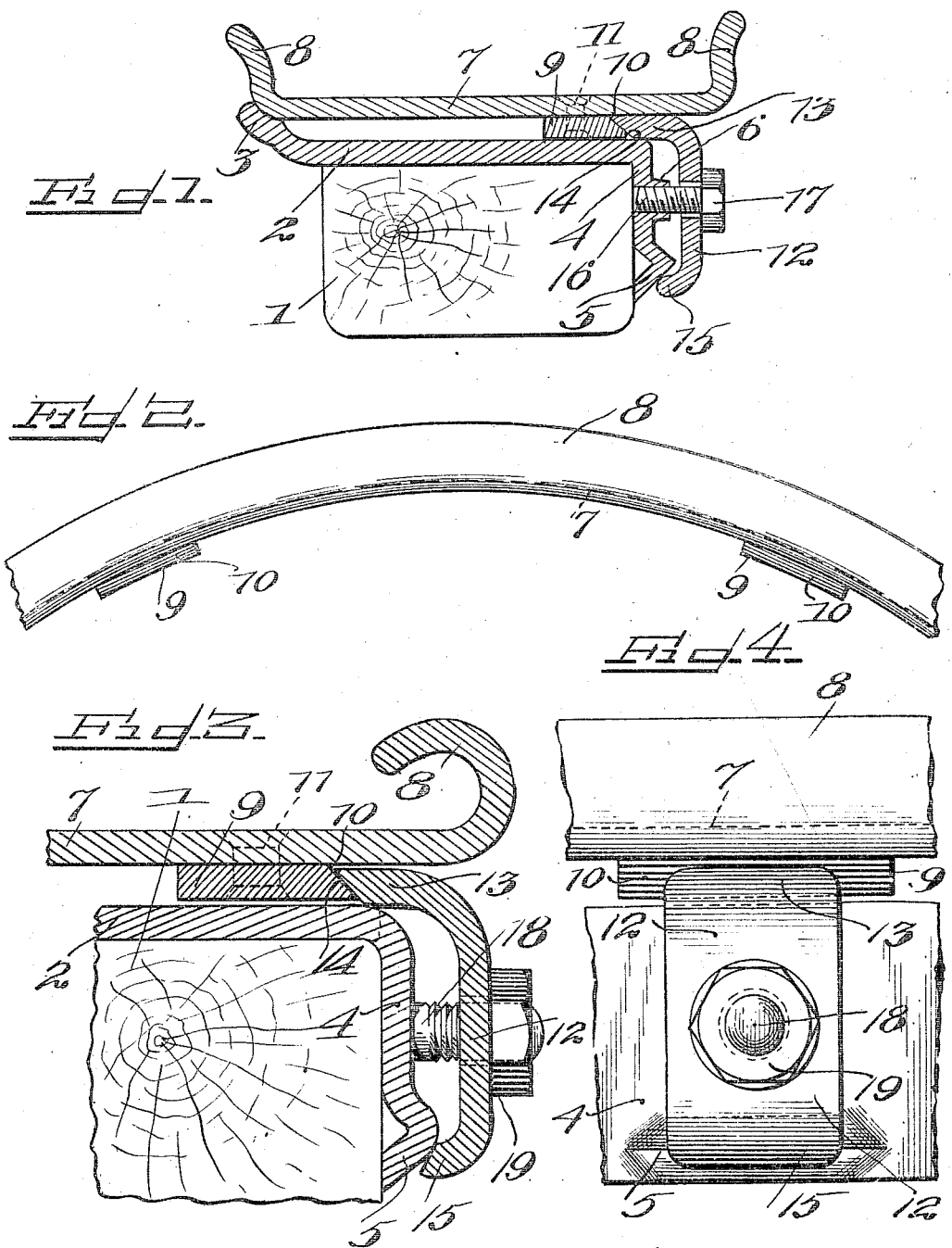

ROBERT W. ASHLEY, OF NEW YORK, N. Y., ASSIGNOR OF ONE-HALF TO FRANK OBERKIRCH, OF ST. MARYS, PENNSYLVANIA.

VEHICLE-WHEEL RIM.

1,305,682.   Specification of Letters Patent.   Patented June 3, 1919.

Application filed May 2, 1916. Serial No. 94,935.

*To all whom it may concern:*

Be it known that I, ROBERT W. ASHLEY, citizen of the United States, residing at New York city, in the county of New York and State of New York, have invented new and useful Improvements in Vehicle-Wheel Rims, of which the following is a specification.

The invention relates to vehicle wheel rims and has particular reference to demountable rims for use in connection with pneumatic tires for motor cars.

The object of the invention is the providing of a felly band having associated therewith reception locking means, and a tire-carrying rim having mounted on its inner surface a plurality of wedge cleats, and a plurality of clamping plates engaging said reception locking means and said cleats, and means engaging said locking means and said plates adapted to contract said tire-carrying rim to seat said cleats on the periphery of said felly band on its front edge thereof and exert a contractive pressure on said rim to seat same on said felly band at its rear edge thereof.

Another object of the invention is the providing of means for locking a tire-carrying rim of either an integral top rim type or one split transversely thereof at a common point in its annular body and locked at that point, or any desirable type of tire-carrying demountable rim.

In the following is described in connection with the accompanying drawings one embodiment of the invention, the features thereof being more particularly pointed out hereinafter in the claims.

In the drawings Figure 1 is a cross sectional view of the rim assembly; Fig. 2 is a detailed view of the tire-carrying rim illustrating the position thereon of the wedge cleats; Fig. 3 is an enlarged detail cross sectional view of the rim locking means; and Fig. 4 is a detailed face elevation of said rim locking means.

Similar numerals of reference indicate similar parts throughout the several views.

In the drawings (1) designates a felly, having mounted thereon a felly band (2) provided with a seating shoulder (3) at its rear edge and a depending flange (4) at its front edge. At regular intervals around the lower edge of depending flange (4) a plurality of bosses (5) are punched in said flange and immediately above said bosses a reception threaded aperture (6) is provided.

(7) indicates a tire-carrying rim provided with tire flanges (8) and has mounted on its inner surface thereof at regular intervals in its circumference a plurality of wedge cleats (9) provided with tapered reception edges (10). Said cleats (9) may be welded to rim (7) or they may be riveted thereto by means of rivets (11).

(12) indicates a locking plate provided at its upper end with an inwardly projecting shoulder (13), having formed on its edge thereof a tapered wedge surface (14) adapted to engage the reception wedge surface (10) on cleat (9), the lower edge of said plate (12) being bent inwardly as at (15) to form a cam surface for engagement with the inclined surfaces on bosses (5). An ordinary threaded bolt (16) provided with a standard hexagon head (17) engaging the threaded aperture (6) in flange (4) is provided and the head thereof is adapted to engage the outer surface of plate (12) and when actuated draw said plate (12) laterally to cause the beveled surfaces (10) and (14) to engage and the cam surface (15) to ride downwardly on the said inclined surfaces of bosses (5) and thereby exert upon the tire-carrying rim a lateral and contractive seating action. By utilizing a plurality of the locking means as above described and by distributing them equally around the felly band of a wheel, a locking means having a positive action is provided wherein each locking element exerts a contractive pressure between the felly band and the tire-carrying rim seating said tire-carrying rim on all of the wedge cleats around the periphery of said felly band at the front edge of the rim, thereby providing locking means for a rim structure of this type obviating wholly any chance of squeaking or movement between the respective rim bodies.

The structure shown in Fig. 3 of the drawings is similar to that above described with the exception that depending flange (4) has mounted therein or fastened thereto threaded studs (18) adapted to receive any type of standard hexagonal nut (19).

It is obvious that the features as herein shown and described may be varied in many ways without departing from the general spirit of the invention.

What I claim and desire to secure by Letters Patent of the United States is—

1. A device of the character described comprising a felly band, contractive locking means associated with said felly band, a plurality of reception supporting means associated therewith, a demountable rim adapted to engage said felly band at the rear edge thereof, a plurality of reception locking cleats mounted on said demountable rim and arranged to engage said felly band at its opposite edge, a plurality of supporting retaining locking means mounted on said supporting means and engaging said contractive locking means and said locking cleats, and means operative on said supporting means and engaging said retaining locking means adapted to exert a contractive and inwardly radial seating action on said demountable rim annularly at one edge thereof and at a plurality of points of contact at the opposite edge thereof.

2. A device of the character described comprising a felly band, contractive locking bosses formed on said felly band, a plurality of reception supporting means associated with said felly band and said contractive locking bosses, a demountable rim adapted to engage said felly band, a series of reception locking cleats mounted on the inner surface of said demountable rim adjacent the front edge thereof arranged for contact with said felly band, a plurality of removable retaining locking plates mounted on said supporting means and arranged to engage said contractive locking bosses and said series of locking cleats, and means associated with said plates engaging said supporting means adapted to actuate said plates to seat said demountable rim on the rear edge of said felly band and to draw said rim and series of cleats into contact with the transverse surface of said felly band adjacent its front edge thereof.

3. A device of the character described comprising a felly band, a plurality of contractive fastening bosses in said band, a plurality of reception studs associated with said band, a demountable rim adapted to engage said felly band, a plurality of cleats provided on said rim adjacent its front edge thereof, a plurality of locking plates arranged for engagement simultaneously with said bosses and said cleats, and a plurality of locking means engaging said studs and plates adapted to seat said demountable rim on the rear edge of said felly band and said cleats on the transverse surface of said felly band adjacent the front edge thereof.

In testimony whereof I have hereunto signed my name in the presence of two subscribing witnesses.

ROBERT W. ASHLEY.

In the presence of—
 E. E. HAINES,
 MARGARET PFEIFFER.